United States Patent [19]

Schermutzki et al.

[11] 4,164,387

[45] Aug. 14, 1979

[54] APPARATUS FOR PRODUCING SHEET MATERIAL

[75] Inventors: Konrad Schermutzki, Remseck am Neckar; Gerhard Stäbler, Murr Kreis Ludwigsburg, both of Fed. Rep. of Germany

[73] Assignee: Sandvik Conveyor GmbH, Fellbach, Fed. Rep. of Germany

[21] Appl. No.: 916,543

[22] Filed: Jun. 19, 1978

[30] Foreign Application Priority Data

Jun. 30, 1977 [DE] Fed. Rep. of Germany ....... 2729559

[51] Int. Cl.[2] ............................................ B29C 3/00

[52] U.S. Cl. .................................... 425/371; 425/141

[58] Field of Search ........................ 425/371, 363, 141

[56] References Cited

U.S. PATENT DOCUMENTS

| | | | |
|---|---|---|---|
| 3,795,470 | 3/1974 | DeMets | 425/371 |
| 3,836,298 | 9/1974 | Ernst | 425/371 X |
| 3,837,774 | 9/1974 | Ross et al. | 425/371 X |
| 3,881,852 | 5/1975 | Ahrweiler | 425/371 X |
| 3,907,473 | 9/1975 | DeMets | 425/371 X |
| 3,926,542 | 12/1975 | Ahrweiler | 425/371 X |
| 3,945,789 | 3/1976 | Boman | 425/371 |
| 4,043,719 | 8/1977 | Jones | 425/371 X |

*Primary Examiner*—J. Howard Flint, Jr.
*Attorney, Agent, or Firm*—Harold L. Stults

[57] ABSTRACT

A method and apparatus for producing sheets of plastic having precisely controlled thickness. Two endless steel belts are positioned to provide coextensive runs between which there is a press-gap of uniform thickness. Each of the belts is provided throughout the treatment zone with a back-up pressure structure formed by a continuous array of rollers positioned along each of the belts and a back-up plate structure which is positioned to provide a precisely controlled gap for the rollers. The rollers are turned by the contact with the belt and roll along a path throughout the length of the treatment zone. Heated liquid is passed through the plates to control the temperature of the product being treated. Each of the plate structures is held against its array of rollers by a plurality of steel bearing strips, the transverse dimension of each of which is controlled by passing a heated liquid through it. The bearing strips, in turn, rest upon a press table which exerts pressure against the belt through the bearing strips, the heating plate and the array of rollers. The strips are thermally responsive so that their dimensions are increased by an increase in temperature, and extend longitudinally of the belt runs. Hence, the desired precise thickness of the press-gap can be controlled by varying the temperature of the strips. The longitudinal positioning of the strips permits the control to be effective transversely of the length of the press-gap.

7 Claims, 3 Drawing Figures

APPARATUS FOR PRODUCING SHEET MATERIAL

This invention relates to an arrangement for regulating the size of the press-gap in twin-belt presses in which the material to be pressed is encapsulated between the opposing runs of two endless steel belts moving together which are held together by pressure plates or the like which are supported on structural members of a press frame. The friction between each belt and its pressure plate is reduced by guide rollers which roll on the pressure plates and through which the necessary pressure is exerted from the press frame. The pressure plates may also be heat-transfer plates so that the material to be pressed can be subjected not only to a predetermined pressure but also to a heat treatment at a particular temperature.

The size of the press-gap is adjusted by screw supports on the sides of the press frame or by wedges, so that the material is pressed to the desired thickness over the entire press cross-section. However, there may be variations in the size of the press-gap over the transverse dimenstion, i.e., the cross-section of the press, as a result of deformation of the pressure plates under the pressures used in pressing. When, as a result of such deformation, the thickness of the material is greater near the edges of the steel belts, for example, the remedy resorted to is to insert thin shim plates between the supports on the press frame and the pressure plates. That method of regulating the press gap over the cross-section is very crude and is of no value when material is to be produced whose thickness must be maintained accurately, as, for example, glass-fiber-reinforced plastic plates to be used as substrates for printed circuits for electronic applications. In that case, it is desirable to maintain a precise parallel position of the support surfaces for the pressure plates on which the support rollers roll.

The invention has as its object to provide a means of controlling and varying, when desirable, the size of the press-gap over the cross-section, that is, at right angles to the direction of belt travel, in a simple manner and with preciseness, without adversely affecting the operation of the dual-belt press.

Carrying out the invention consists in arranging spacers between the structural members and the pressure plates, the spacers being of equal height and adapted to be heated in a controlled manner. With this arrangement, the thermal expansion characteristics of the spacers are utilized to vary that spacing precisely. That makes is possible to control the positioning of the opposing pressure plates relative to each other, for example, by observing the cross-section of the finished product, and then adjusting the press-gap dimension throughout the cross-section. It has been found that sufficient thermal expansion can be produced at a cost within an acceptable range which is adequate for controlling the press-gap.

The spacers are bearing strips disposed along the direction of belt travel and distributed evenly over the width of the pressure plates. It is advantageous to provide at least two bearing strips parallel to each other so that very sensitive press-gap adjustment is possible. For constructional reasons, it is also advisable to provide a plurality of bearing strips in a row in the direction of belt travel. Each of the bearing strips may extend only a portion of the length of the pressing range so that the machining can be done economically.

The bearing strips are of a material having a specific thermal expansion, preferably steel, in order that a particular amount of thermal expansion is obtained with a given temperature increase. The bearing strips may be provided with channels for a liquid medium preheated to a particular temperature, the channel preferably extending in the direction of the longitudinal dimension of the bearing strip. The heating medium may be fuel oil which is used currently in dual-belt presses to heat the pressure plates. The oil may be circulated in a loop and passed through a heat exchanger with the heat transfer rate being controlled using a thermocouple positioned on the bearing strips. That provides for continuous automatic or manual monitoring of the temperature of the bearing strips, and therefor the press-gap size. Each individual bearing strip may have its own heating circuit for the heating medium. That makes it possible to provide press-gap or thickness control over the cross-section of the press and also in the direction of belt travel. When control in the belt direction is not necessary, each entire row of bearing strips is connected to a heating circuit so that two, three, four or five rows, for example, are disposed parallel to one another in the direction of belt travel. Each row is then heated individually, thus permitting a press-gap variation at right angles to the direction of belt travel. Control of the various heating circuits may also be obtained by means other than thermocouples or thermostats associated with each row of bearing strips. For some operations, it is feasible and has been found practical to use a thickness-measuring system to monitor the moving product web directly, and to adjust the temperature of the individual heating circuits for the bearing strip row by means of a proportional-plus-reset-action controller. A suitable thickness-measuring system is, for example, that known by the name Nukleometo-Schlumberger.

In the case of dual-belt presses where the pressure plates also serve as heating plates for bring the material to be pressed to a certain temperature, it has been found advantageous to heat-insulate the bearing strips not only from the press frame, as is done in prior-art designs utilizing heating plates in order to prevent the press frame from heating up, but also from the heating plates, in order that the latter may not exert an undesired or unacceptable influence on the temperature to which the bearing strips are heated. The undesirable effect of the insulating material being compressible under pressure by amounts of one-tenth of a millimeter can be compensated for by the invention.

Twin-belt systems of the above types have been used for producing continuous sheets of material with the untreated material being fed to a press-gap and subjected to controlled pressure at an elevated temperature. The press-gap thickness or transverse dimension is the distance between coextensive surfaces of the two belts in the treatment zone and that dimension determines the thickness of the finished product treated therein. Illustrative embodiments of the invention are shown in the drawing and explained in the description which follows.

Figure 1:
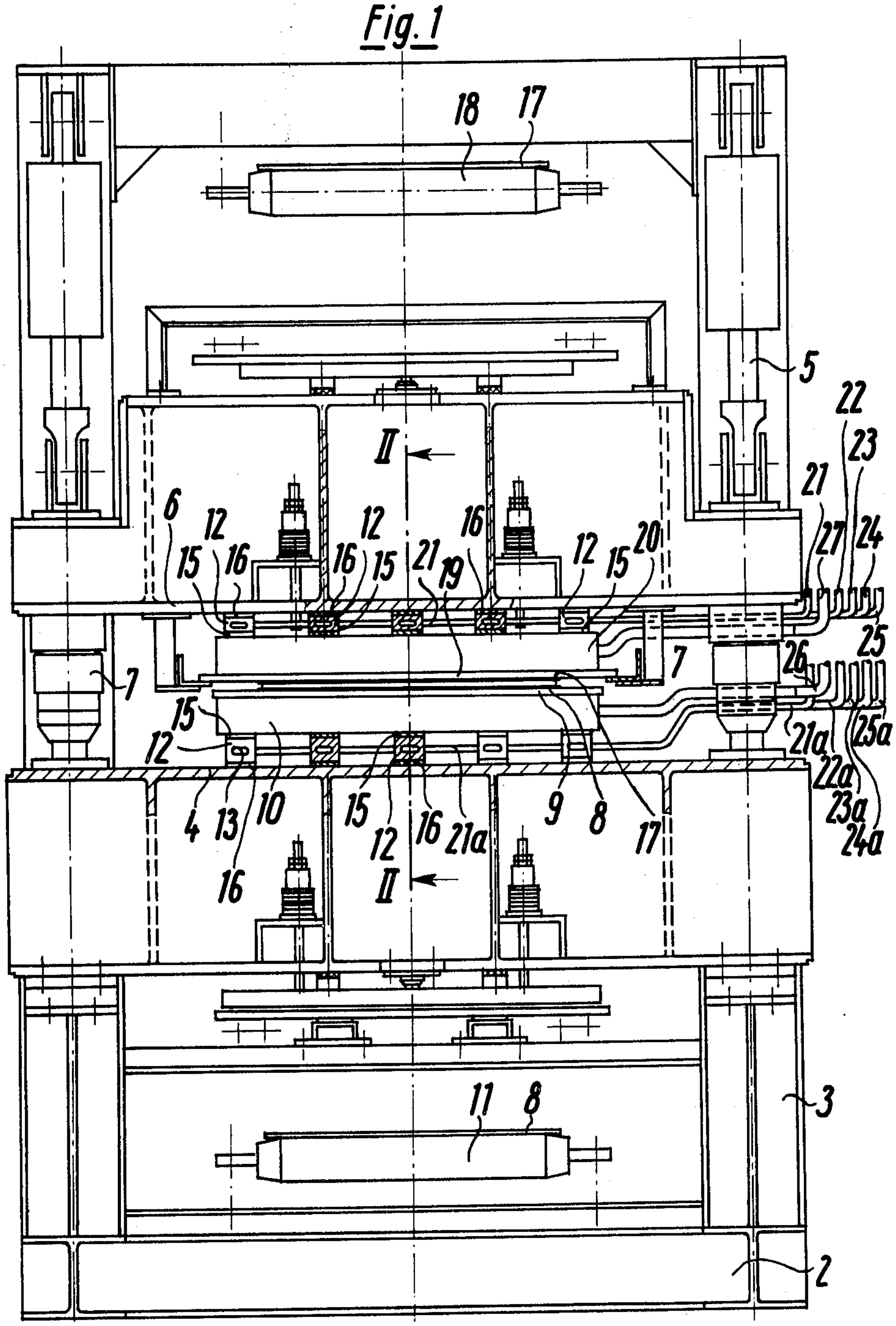
FIG. 1 is a cross-section through a dual-belt press constructed in accordance with the invention, with parts broken away.

Referring to FIG. 1 of the drawings, a press has a base frame 2 resting on the floor with vertical structural members 3 along the opposite sides, a lower press table 4 built up from girders, and a similar upper press frame 6 which is vertically displaceable by means of a knuckle-joint arrangement 5. The spacing of press frame 6 from press table 4 is adjustable by a plurality of adjustable supports 7 disposed along the sides of the press and supported by press table 4.

Mounted in a known manner on the press frame are two endless steel belts, a lower belt 8 and an upper belt 17. Each of belts 8 and 17 is supported by end rolls (not shown) and within the pressing or treatment zone each belt engages a plurality of guide rolls 9 and 19, respectively, which are of small diameter and roll between the belt and plates 10 and 20, respectively, which are supported by press table 4 and frame 6, respectively. The return runs of belts 8 and 17 are slack and are supported by a plurality of support rollers 11 and 18, respectively. Plate 10 is supported on table 4 by a plurality of steel bearing strips 12 which are parallel to one another and spaced equally across the width of the heating plate. Bearing strips 12 act as spacers between press table 4 and heating plate 10 and they are adapted to be heated.

Figure 2:
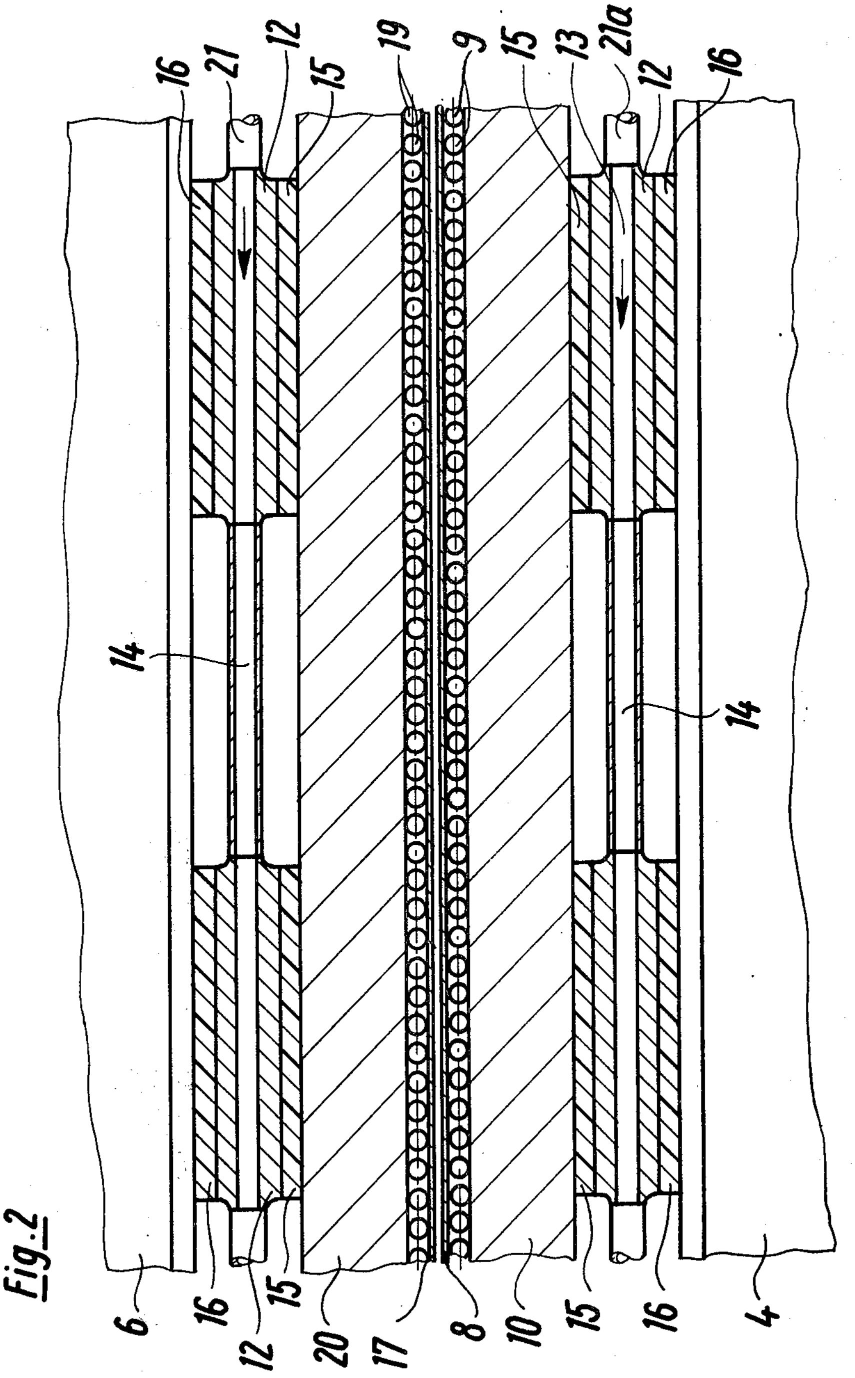
FIG. 2 is a portion of a longitudinal section along the vertical center line II—II in FIG. 1 through a portion of the pressing range; and, FIG. 3 is a diagram of the heating circuits associated with the individual bearing strips or rows of bearing strips.

Referring to FIG. 2, each of the bearing strips 12 is formed by a plurality of sections, each of which has a longitudinal passageway therethrough and it is spaced from and connected to the next section by a tube 14. The passageways through the bearing strip sections are somewhat oval (see FIG. 1) and tubes 14 are of the same cross-sectional configuration. Each of the bearing strips extends the length of the treatment zone and is adapted to provide the desired spacing between its press table (or frame) and its heating plate. The array of guide rollers 9 is then positioned between heating plate 10 and belt 8 and the array of rollers 19 is similarly positioned between its heating plate 20 and its belt 17 and as the belts pass together longitudinally through the treatment zone, the movement of belt 8 rotates rollers 9 and causes them to roll along the top surface of heating plate 10 through the treatment zone. Direct contact between each of the bearing strips and its press table is prevented by a layer of insulation 16 and there is a similar layer of insulation 15 between each bearing strip and its heating plate.

Referring now to FIG. 1, with the construction shown and described, the heating of bearing strips 12 while supporting heating plate 10, causes the various strips to expand and they lift the heating plate and that reduces the thickness or transverse dimension of the press-gap between the belts. Similarly, the heating of the upper set of bearing strips 12 presses heating plate 20 downwardly to provide a similar reduction in the thickness of the press-gap. The insulation between the bearing strips and press table 4 and frame 6 minimizes to an acceptable level the heat leakage between the bearing strips and the press table. Similarly, the insulation between the bearing strips and the heating plates reduces the effective heat leakage between the bearing strips and the heating plates.

Figure 3:
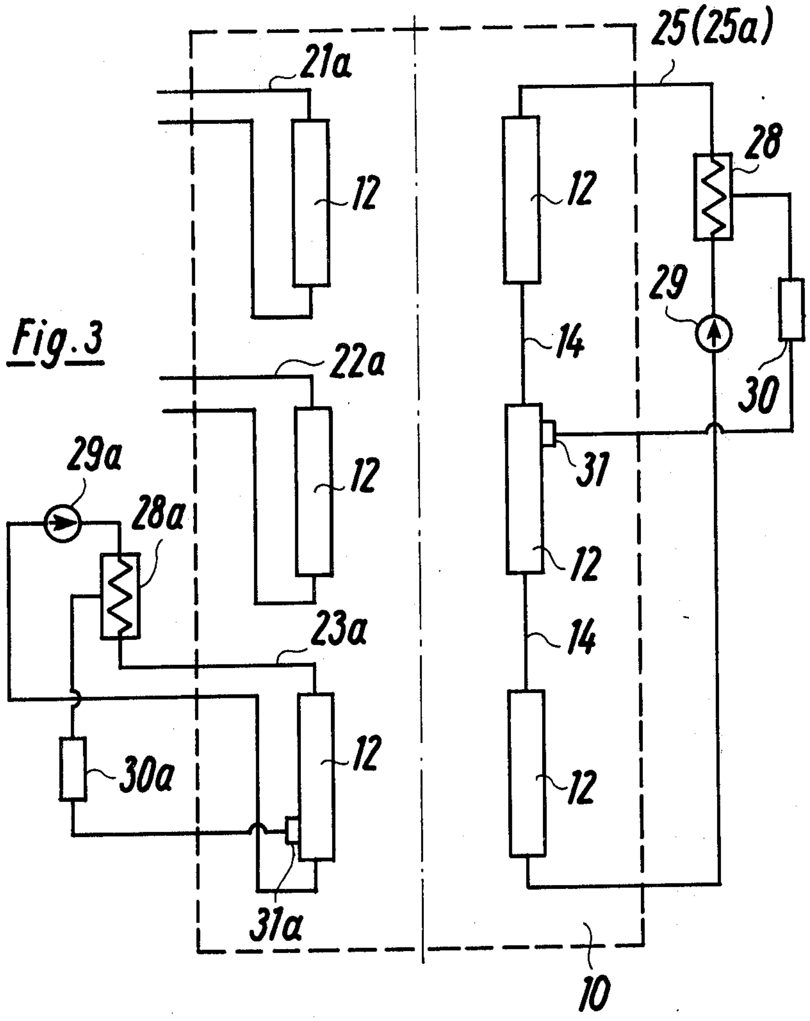

The system for controlling the temperature of the bearing strips is shown in FIG. 3. The bearing strips at the right are connected in series so that a single stream of heating liquid flows through the bearing strips. A pump 29 provides circulation through a heat exchanger 28 where the heating liquid is heated. A control thermostat 30 has its thermocouple 31 positioned on the center bearing strip 12 to sense the bearing strip temperature and exerts control upon heater 28. The group of bearing strips 12 shown at the left in FIG. 3 are provided with individual circuits and individual temperature controls. Hence, heat exchanger 28, pump 29a and thermostat 30a and thermocouple 31a perform the respective functions of heat exchanger 28, pump 29, thermostat 30 and thermocouple 31, but provide heat to only one bearing strip.

The invention contemplates that accurate control can be provided for each individual bearing strip or for any combination, depending upon the complexity of the construction and its functions. For some operations, it is desirable to provide the single-flow circuit shown at the right in FIG. 3 for all of the bearing strips which are in alignment through the length of the treatment zone. For other circumstances, each group of bearing strips transversely of the direction of belt movement can be heated from the single heat exchanger and maintained at the same temperature.

Referring now to FIG. 1, the individual rows of bearing strips are supplied through feed pipes 21, 22, 23 and 24, with feed pipe 21 serving the extreme left-hand rows above the treatment zone. The respective rows going to the right are supplied through feed pipes 22 to 25, respectively. Similarly, the bearing strips from right to left below the treatment zone are supplied through feed pipes 21a to 25a, respectively. The lower heating plate 10 receives heating liquid through pipe 26 and the upper heating plate 20 receives heating liquid through pipe 27.

In addition to the automatic control of the temperature of the heating liquid, or in place thereof, the temperatures of the heating liquid can be controlled in accordance with the measurement of the thickness of the product, when that mode of control is desirable. For that purpose, each row of bearing strips longitudinally of the treatment zone may be treated as a controlled unit. The thickness of the product is measured for each such row and the temperature control is exerted, utilizing a device referred to as the Nukleometer and marketed by Schlumberger. That provides a "proportional-plus-reset-action" control function. In the illustrative embodiment, the steel bearing strips are 150 millimeters high, and a variation of 0.66 millimeters can be obtained in the press-gap with a temperature range of 200° C. The invention also contemplates that for some commercial operations that manual control can be provided which will maintain the product thickness within acceptable limits. With that system, the thickness can be manually or automatically measured and appropriate control can be then exerted to provide the temperature of the heating liquid which will produce the desired quality characteristics of the product. The invention also contemplates that other heating means may be provided and that variations in the construction and operation and other embodiments of the invention may be provided within the scope of the claims.

What is claimed is:

1. In a twin-belt press wherein two endless belts are mounted to provide parallel belt runs which present coextensive belt surfaces between which there is a press-gap which comprises a treatment zone within which the material is compressed by opposing forces exerted on the material by said belt surfaces, and wherein it is desirable to control the dimension of said press-gap transversely of said coextensive belt surfaces, that improvement which comprises means to control said dimension of said press-gap including, pressure means positioned upon the opposite sides of said belt runs to exert said opposing forces urging said coextensive surfaces toward each other with a predetermined spaced relationship therebetween, thermal responsive means which changes in its dimension in the direction of said forces in response to changes in it temperature, and means to control said temperature whereby increases and decreases in said temperature vary said dimension of said press-gap.

2. The construction described in claim 1 which includes, a pair of back-up plate structures positioned along said belt runs upon the opposite sides thereof with there being a gap between each of said runs and the respective of said plate structure, and two sets of freely rotating rollers with the respective sets being positioned within said gaps and each roller having a diameter equal to the transverse dimension of its gap whereby said rollers exert said pressure on said belts, said rollers being positioned to roll in a continuous series parallel to said belt runs because of their contact with the respective belt runs.

3. The construction described in claim 1, wherein said thermal responsive means comprises a plurality of steel strips positioned longitudinally of the direction of movement of said belts, and wherein said means to control said temperature comprises means to supply heated liquid in heat exchange relationship with said thermal responsive means.

4. The construction as described in claim 3, wherein there is a plurality of said strips positioned in parallel relationship and spaced in a controlled manner between the side edges of said belts.

5. In a twin-belt system, the combination of, a base frame, a pair of press tables mounted on said base frame and positioned in spaced relationship from each other to provide a treatment zone, a pair of endless belts mounted in said base frame and having coextensive runs extending between said press tables and being positioned to define said treatment zone, a press structure positioned between said press tables and adapted to exert pressure upon said belt runs and thence upon a product positioned between said belt runs within said treatment zone, said press structure including a plurality of strips extending longitudinally of said belt runs and being constructed and arranged to increase dimensionally to reduce the press-gap between said belt runs in response to changes in temperature, and means to control the temperature of said strips.

6. The construction as described in claim 5, wherein said strips are of steel, and insulating means to minimize the effect of heat exchange between said strips and the adjacent structure.

7. The construction as described in claim 6, which including a heating plate between said strips and said belt, an array of rollers between said heating plate and the adjacent one of said belts, a second array of rollers upon the opposite side of the other of said belts and means to support said second array of rollers.

* * * * *